(12) United States Patent
Jung et al.

(10) Patent No.: US 7,693,934 B2
(45) Date of Patent: Apr. 6, 2010

(54) NETWORK DEVICE, SYSTEM AND METHOD FOR PROVIDING LIST OF CONTROLLED DEVICES

(75) Inventors: Dong-shin Jung, Seoul (KR); Kyoung-hoon Yi, Seoul (KR); Hyun-gyoo Yook, Seoul (KR); Hyun-sik Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1468 days.

(21) Appl. No.: 10/825,668

(22) Filed: Apr. 16, 2004

(65) Prior Publication Data

US 2004/0208159 A1 Oct. 21, 2004

(30) Foreign Application Priority Data

Apr. 16, 2003 (KR) .................. 10-2003-0024176

(51) Int. Cl.
*G06F 15/16* (2006.01)
(52) U.S. Cl. .................. 709/203; 709/208; 709/223; 709/224
(58) Field of Classification Search .......... 709/208, 709/223, 224, 203
See application file for complete search history.

(56) References Cited

U.S. PATENT DOCUMENTS

| | | | | |
|---|---|---|---|---|
| 5,821,937 A | * | 10/1998 | Tonelli et al. | 715/853 |
| 5,905,859 A | * | 5/1999 | Holloway et al. | 726/22 |
| 6,021,429 A | * | 2/2000 | Danknick | 709/208 |
| 6,473,783 B2 | * | 10/2002 | Goshey et al. | 709/203 |
| 7,130,582 B2 | * | 10/2006 | Barilovits | 455/41.2 |
| 7,146,403 B2 | * | 12/2006 | Tock et al. | 709/206 |

FOREIGN PATENT DOCUMENTS

| | | |
|---|---|---|
| JP | 7-262042 A | 10/1995 |
| JP | 2000-224197 A | 8/2000 |
| JP | 2000244549 A | 9/2000 |
| JP | 2001-320393 A | 11/2001 |
| JP | 2000-40039 A | 2/2002 |
| JP | 2002-252882 A | 9/2002 |
| JP | 2002-312258 A | 10/2002 |
| JP | 2002369264 A | 12/2002 |
| WO | WO 03/030452 A2 | 4/2003 |

* cited by examiner

*Primary Examiner*—Vivek Srivastava
*Assistant Examiner*—Adnan Mirza
(74) *Attorney, Agent, or Firm*—Sughrue Mion, PLLC

(57) ABSTRACT

A network device having a message receiving module for receiving notify messages transmitted from controlled devices connected in a network, a device list management module for collecting information regarding the controlled devices connected in the network and creating and managing a list of service information of all the controlled devices connected in the network, and a control module for searching for service information of a specific controlled device, which has been requested by a control point, in the device list management module and transmitting the searched information. Since a controlled device has a list of other controlled devices connected thereto in a network, when a message searching for a specific controlled device has been received from a control point, another controlled device can transmit a response message to the control point on behalf of the specific controlled device even though the specific controlled device cannot receive the message from the control point.

33 Claims, 14 Drawing Sheets

US 7,693,934 B2

NETWORK DEVICE, SYSTEM AND METHOD FOR PROVIDING LIST OF CONTROLLED DEVICES

This application claims the priority of Korean Patent Application No. 10-2003-0024176 filed on Apr. 16, 2003, in the Korean Intellectual Property Office, the disclosure of which is incorporated herein by reference.

BACKGROUND OF THE INVENTION

1. Field of the Invention

The present invention relates to a network device, system and method for providing a list of controlled devices, and more particularly, to a network device, system and method for providing a list of controlled devices, wherein each of the controlled devices connected in a network has a list of other controlled devices, and upon receipt of a message searching for a specific controlled device from a control point, the controlled device can transmit a response message to the control point on behalf of the specific controlled device.

2. Description of the Related Art

Generally, a home network is constructed of a private network based on the Internet protocol (IP) and controls a variety of equipment, such as all types of personal computers, intelligent products and wireless apparatus used indoors at home, by connecting them in a single network.

As for a home network method, there has been proposed a method wherein a common virtual computing environment called 'middleware' is established with respect to equipment existing in a private network and applications are then provided to the middleware. The middleware enables communication among the various kinds of equipment in a home network. As for such middleware, Home AV Interoperability (HAVI), Universal Plug and Play (UPnP), Jini, and Home Wide Web (HWW) have been proposed up to now.

Various pieces of equipment existing in a home network are connected to one another through such home network middleware via a Peer-to-Peer type network, and each piece of equipment uses an IP address that is assigned by a dynamic host configuration protocol (hereinafter, referred to as "DHCP") server or selected by an automatic IP designating function (Auto IP).

Namely, when initially connected to a home network, each piece of equipment searches for the DHCP server, and acquires an address assigned depending on the response from the DHCP server or automatically selects an IP address within a predetermined range by using Auto IP in case of a network in which a DHCP server is not running.

Such equipment using an IP address assigned by the DHCP server or selected by Auto IP communicates with the other equipment in the network by using Transmission Control Protocol/Internet Protocol (TCP/IP) and can be searched for and referred to in the network through the IP address.

Further, in home network middleware such as UPnP, a protocol such as Simple Service Discovery Protocol (hereinafter, referred to as "SSDP") is used as a method of searching for equipment existing in the home network. Here, the SSDP can be roughly divided into two types: a multicast search (M-Search) message for use in searching for a given type of controlled device (hereinafter, referred to as "CD") desired by a control point (hereinafter, referred to as "CP"), and a notify message used when a CD notifies its own state. As for the notify message, there are a Notify Alive message sent after a CD is connected to a network and assigned its own IP, and a Notify Byebye message sent when a CD is normally removed from the network. Namely, if a CD is connected to a network, the CD is assigned an IP address by the DHCP server or in an Auto-IP manner and then sends a Notify Alive message via user datagram protocol (UDP) multicast in order to notify that the CD has been added to the network. However, since the CD does not know whether a UDP packet is properly delivered, the CD repeatedly transmits the same Notify Alive message to the same multicast addresses several times.

Furthermore, if a CP receives a command to perform a specific service from a user or an application, the CP creates a multicast search message to search for a given type of CD necessary for performing a relevant service and transmits the multicast search message via UDP multicast. Similarly to the situation just discussed in regard to the DC repeatedly transmitting a Notify Alive message, according to UDP multicast, since the CP does not know the delivery state of the transmitted multicast search message, the CP repeatedly transmits the same multicast search message to the same multicast addresses more than one time.

Moreover, a CD that has received a multicast search message transmitted from the CP makes and transmits a multicast search response message to the CP if the type of the CD conforms to the type requested by the CP. Then, the CP collects response messages to its transmitted multicast search message, selects a specific CD and stores information with respect to the selected CD in a cache of the CP itself, if necessary. Thereafter, the CP can control the CD necessary for performing a relevant service through collected CD information and CD information stored in its cache.

In the meantime, if a CD is normally removed from the network, the CD first makes a Notify Byebye message and transmits the message via UDP multicast. Then, the CP that has received the message deletes the relevant CD information stored in its cache.

FIG. 1 is a view showing an operation process of controlling UPnP controlled devices existing in a home network of the related art. Control points CP1-CP3 perform respective discovery processes for searching for a device connected to the network in order to use a desired service. Each discovery process employs a multicast search method for transferring a multicast packet to all devices connected to the network. According to the UDP method used, however, it is impossible to confirm whether the multicast packet has been received.

First, if CPs 2000 to 2200 perform respective discovery processes of searching for desired devices, CDs 1000 to 1500, which are connected to the network transmit response messages as device packets. However, a multicast search message for finding CDs 1000 to 1500 transmitted from CP2 2100 may not be delivered to CD2 1100, or CD3 1200 that has received the multicast search message may not be able to transmit a multicast search response message to CP2 2100 while the relevant packet is lost. In this case, CP2 2100 fails to find a relevant CD.

FIG. 2 is a view showing a case where the control point does not receive a response message 100, which has been sent by the controlled device CD2 (1100), to the device packet transmitted from the control point CP1 (2000) in the home network of the related art. FIG. 3 is a view showing a case where the controlled device CD2 (1100) does not receive the device packet 200 transmitted from the control point CP1 (2000) in the home network of the related art.

FIG. 4 is a view showing a case where the control point CP1 (2000) does not know the state of a controlled device CD1 (1000) abnormally removed in the home network of the related art. If CDs 1000 to 1200 are normally removed from the network, CDs 1000 to 1200 prepare their Notify Byebye messages and transmit them via UDP multicast. Then, CP 2000 that has received the Notify Byebye message deletes information on the relevant CDs from its cache 2010. Thus, a CP can recognize that relevant CDs do not exist in the network.

However, in a case where any one of CDs 1000 to 1200, which has been connected and operated, abnormally stops its operation, the CD cannot transmit a Notify Byebye message and, thus, it is incorrectly recognized by the cache 2010 of CP 2000 that the relevant CD is still alive. Such incorrect cache information remains until the duration of the CD recorded together with the information in the cache 2010 of the CP 2000 elapses. Namely, since the UPnP discovery mechanism can know CD information remaining in the cache only through a Notify Alive message or a Notify Byebye message sent by a relevant CD, there is no way to inform the CPs of such abnormal removal of a relevant CD if the relevant CD is abnormally terminated.

Therefore, there is a need for a method and device, wherein CDs connected to a UPnP network can multicast notify messages to mutually inform the states of the CDs themselves, or it is possible to solve a cache coherence problem that a relevant CD is recognized to operate due to the duration thereof remaining in the cache of CP 2000, even in a case where the relevant CD abnormally ceases operation.

SUMMARY OF THE INVENTION

The present invention is conceived to solve the aforementioned problems. An object of the present invention is to provide a network device, system and method for providing a list of controlled devices, wherein each of controlled devices connected in a network has a list of other controlled devices, and upon receipt of a message searching for a specific controlled device from a control point, the controlled device can transmit a response message to the control point on behalf of the specific controlled device.

Another object of the present invention is to provide a network device, system and method for providing a list of controlled devices, wherein when it is found that a specific controlled device does not exist in a network while controlled devices update their own lists of other controlled devices, they notify a control point of the absence so as to delete the controlled device, which no longer exists in the network, from a cache of the control point, thereby enabling recognition of the exact states of currently running controlled devices.

According to one aspect of the present invention for achieving the objects, there is provided a network device comprising a message receiving module for receiving notify messages transmitted from controlled devices connected in a network; a device list management module for collecting information on the controlled devices connected in the network and creating and managing a list of service information of all the controlled devices connected in the network; and a control module for searching for service information of a specific controlled device, which has been requested by a control point, in the device list management module and transmitting the searched information.

According to another aspect of the present invention, there is provided a method of providing a list of controlled devices, comprising the steps of receiving notify messages from controlled devices connected in a network; collecting information on the controlled devices connected in the network through the received notify messages and generating the list of controlled devices; receiving an information request message for a specific controlled device; searching for information on the specific controlled device for which the information request message is received, in the generated list; and transmitting the information on the searched specific controlled device.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Preferred embodiments of the present invention will be described in detail with reference to the accompanying drawings.

Figure 1:
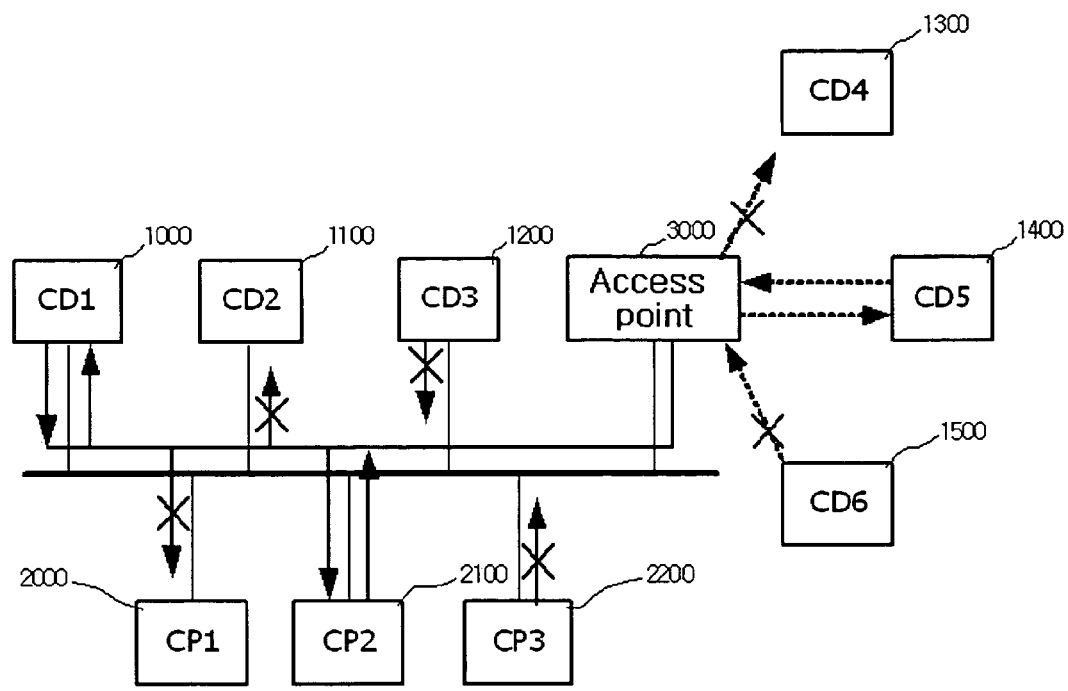
FIG. 1 is a view showing an operation process of controlling UPnP controlled devices existing in a home network of the related art.
Figure 2:
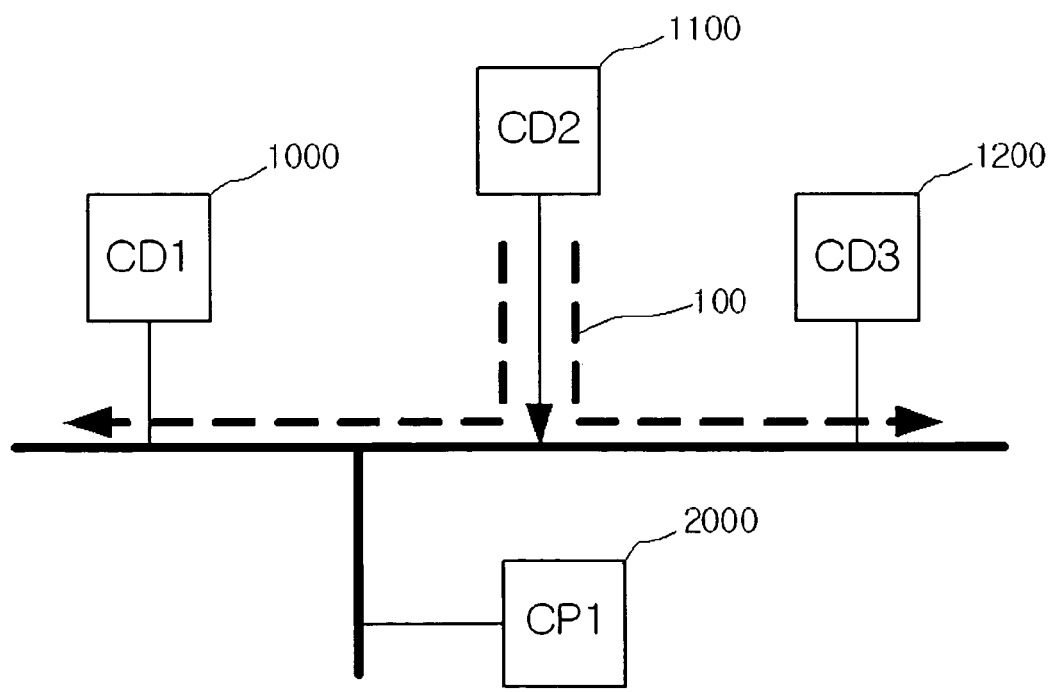
FIG. 2 is a view showing a case where a control point does not receive a response message, which has been sent by a controlled device, to a device packet transmitted from the control point in the home network of the related art.
Figure 3:
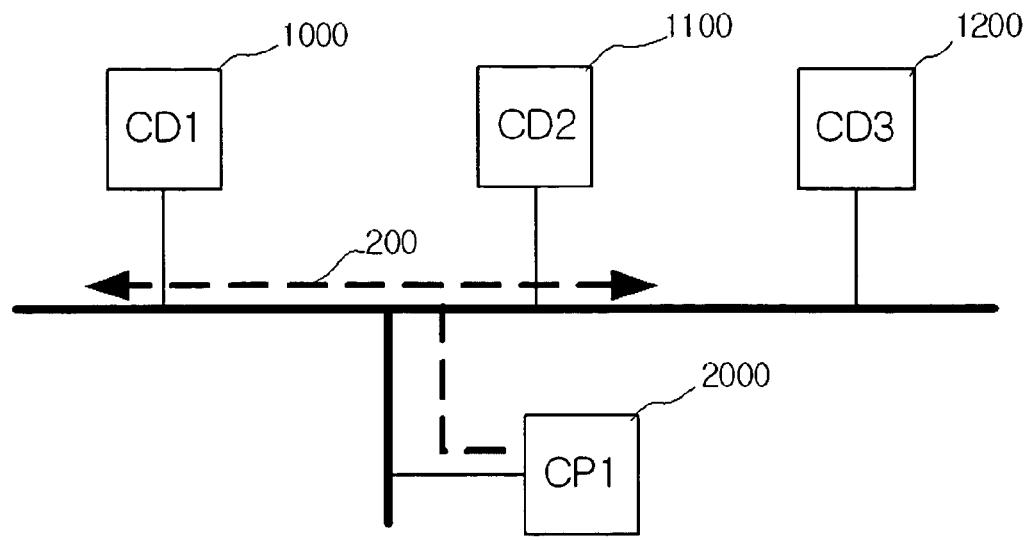
FIG. 3 is a view showing a case where a controlled device does not receive the device packet transmitted from the control point in the home network of the related art.
Figure 4:
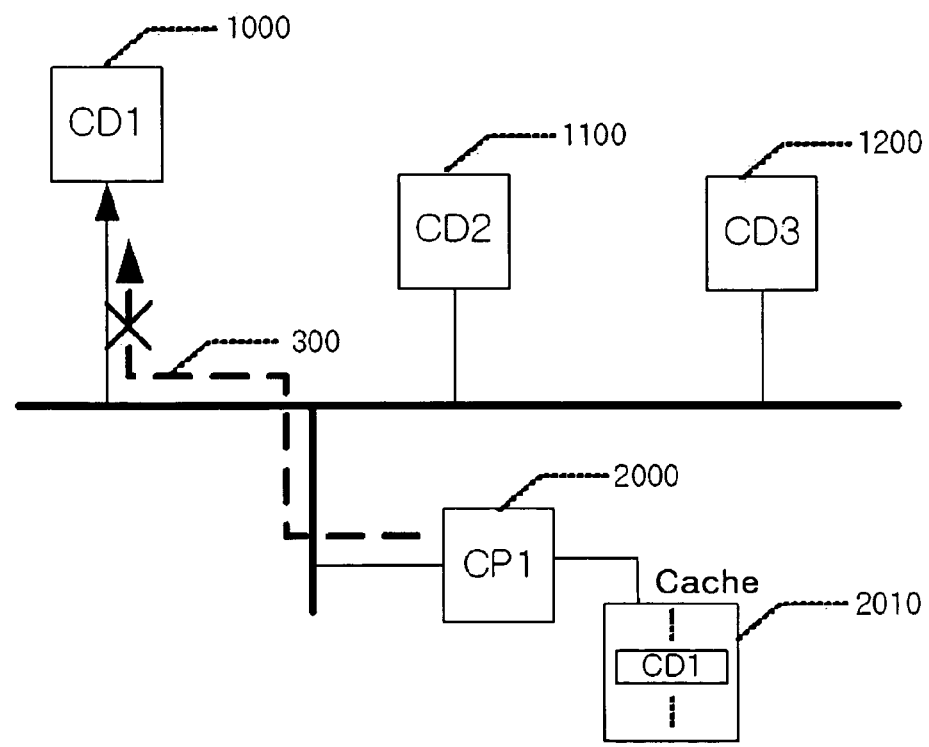
FIG. 4 is a view showing a case where the control point does not know the state of a controlled device abnormally removed in the home network of the related art.
Figure 5:
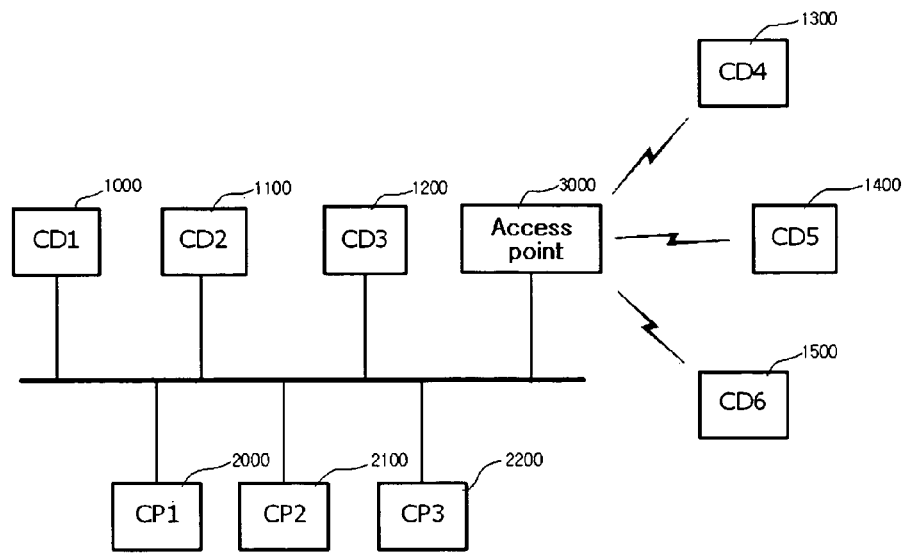
FIG. 5 is a view schematically showing the entire configuration of a network system for providing a list of controlled devices according to the present invention.

FIG. 5 is a view schematically showing the entire configuration of a network system for providing a list of controlled devices according to the present invention. The network system comprises an access point 3000, control points (CPs) 2000 to 2200, and controlled devices (CDs) 1000 to 1500.

The access point 3000 is a device for connecting the control points 2000 to 2200 with the controlled devices 1000 to 1500, which are connected with the access point through a wireless communication network.

The control point 2000 controls the controlled devices 1000 to 1500 existing in the network by transmitting a discovery packet to search for the controlled devices 1000 to 1500 existing in the network, and receiving response messages thereto.

The controlled device 1000 receives notify messages transmitted from the other controlled devices 1100 to 1500 connected in the network, generates and manages an information list of all the controlled devices 1000 to 1500 connected in the network, and searches for and transmits information on a specific controlled device requested by the control point 2000. The configuration and operation of the controlled device will be described hereinafter in more detail with reference to FIG. 6.

Figure 6:
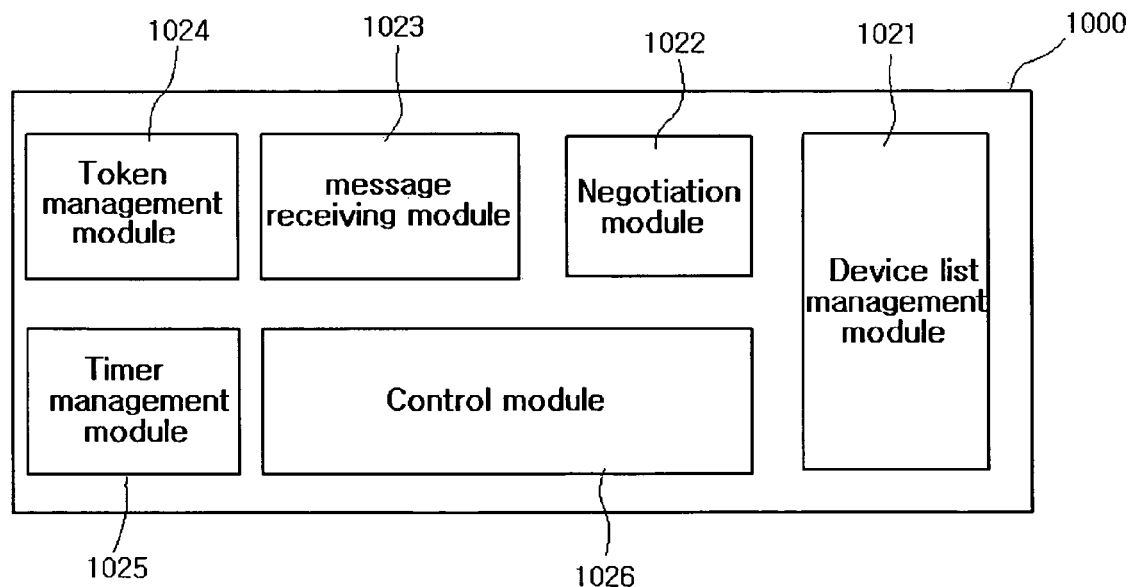
FIG. 6 is a view showing the inner configuration of a controlled device of the network system for providing the list of controlled devices according to the present invention.

FIG. 6 is a view showing the inner configuration of the controlled device 1000 of the network system for providing the list of controlled devices according to the present invention. The controlled device 1000 comprises a device list management module 1021, a negotiation module 1022, a message receiving module 1023, a token management module 1024, a timer management module 1025, and a control module 1026.

The message receiving module 1023 receives notify messages transmitted from the controlled devices 1000 to 1500 connected in the network, and a search (M-search) message transmitted from the control point 2000 (FIG. 5).

The device list management module 1021 collects information on the controlled devices 1000 to 1500 connected in the network, and generates and manages a list of service information of all the controlled devices 1000 to 1500 connected in the network.

The control module 1026 searches for and transmits service information on a specific controlled device requested by the control point 2000 in and from the device list management module 1021. Further, the control module 1026 respond to an information request message from the control point 2000 by checking whether a token is present in the controlled device, and checks state information on the controlled device after checking whether a token is present. Here, the state information may be considered as an initial state, an active state or a stop state. The initial state means a state where the number of controlled devices included in a list of controlled devices held by a controlled device itself is 1 (namely, only the device itself is present in the list), and is a state that can be obtained only in an initial state of the controlled device. When the list of controlled devices is updated and thus the number of controlled devices becomes more than 2 starting from the initial state, the controlled device 1000 changes its own state to the active state. The active state means a state where the controlled device itself currently has a token and is performing a service. The stop state is a state where the controlled device completes service performance and currently is inoperative. Meanwhile, checking whether a token is present is performed using the state information.

The token management module 1024 generates a token, transfers the generated token to another controlled device and manages the token.

The timer management module 1025 generates a self-timer and a waiting timer. The self-timer checks a response time of another controlled device to which a token is transferred in a case where a token managed by the token management module 1024 is transferred to another controlled device. That is, each controlled device begins to operate its self-timer when handing over the token to another controlled device or waiting for a response (ACK), and terminates the self-timer upon reception of a response from the other controlled device. Further, if no response is received from the other controlled device while the self-timer is operating, for example, after a certain period of time has lapsed, the controlled device retries the operation of the self-timer (for example, three times). If no response is still received even after the operation of the self-timer has retried three times, the controlled device transmits a Notify Byebye message on behalf of the other controlled device, deletes the other controlled device from its own list and performs the next operation.

Meanwhile, the waiting timer checks the total circulation time of the token for controlled devices existing in the network. That is, the waiting timer is a timer for causing a specific controlled device to predict operation-terminating timing in proportion to the number of controlled devices remaining in a list of controlled devices held by the specific controlled device and to be on standby for a time until the predicted timing after the specific controlled device normally completes its service operation. If the time set by the waiting timer elapses, a new token is generated and the token and the list are transmitted to the next controlled device. Further, all controlled devices remaining in the stop state should operate the waiting timers thereof. In a case where the number of controlled devices included in a list held by a relevant controlled device is 1 at the time when the waiting timer thereof should be operated, the relevant controlled device transmits a Notify Alive message to other controlled devices and operates the waiting timer after changing its state to the stop state so as to notify other controlled devices that the relevant controlled device is alive.

In the meantime, the self-timer and the waiting timer do not operate simultaneously, and only the timer appropriate for the current state of the controlled device 1000 operates.

If a plurality of tokens are present in the controlled devices existing in the network, the negotiation module 1022 controls the validity of each token. Here, the negotiation module 1022 determines whether a plurality of tokens are present using the state information of each controlled device. Further, the negotiation module 1022 controls the validity of each token by comparing the numbers of controlled devices included in lists of controlled devices stored in controlled devices having the tokens with one another. If the numbers of controlled devices included in the respective lists of the controlled devices are the same as a result of the comparison, the negotiation module 1022 controls the validity of each token by comparing the sums of network remaining duration times of the respective controlled devices registered in the lists with one another. Here, the network remaining duration time of each controlled device is transmitted together when each controlled device transmits a Notify Alive message and is calculated based on a duration time of each controlled device.

Figure 7:
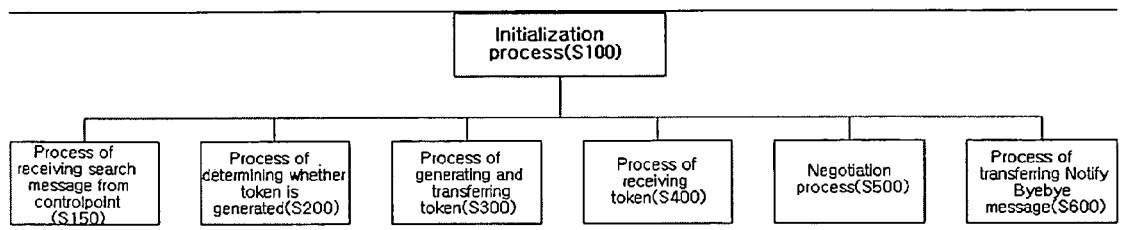
FIG. 7 is a flowchart generally illustrating a method of providing a list of controlled devices according to the present invention.

FIG. 7 is a flowchart generally illustrating a method of providing a list of controlled devices according to the present invention. First, the controlled device 1000 (FIG. 6) performs an initialization process of preparing a list of other controlled devices by receiving notify messages from other controlled devices 1100 to 1500 connected in a network (S100).

Thereafter, the controlled device 1000 performs a token generation determining process of generating a token, a token transferring process of transferring the generated token to another controlled device, and a token receiving process of receiving a token (S200, S300, S400). In a case where a plurality of tokens are present in the controlled devices 1000 to 1500 existing in the network, a negotiation process of controlling the validity of each token is performed (S500). In a case where a response message is not transmitted from other controlled devices, a Notify Byebye message transferring process of informing the control point 2000 that the specific controlled device 1000 is removed from the network is performed (S600), and a search message receiving process of receiving a search message, which searches for information on a specific controlled device, from the control point 2000 is also performed (S150). Here, each process described above may be performed in parallel depending on the circumstances. The method of providing the list of controlled devices will be described hereinafter in greater detail with reference to FIGS. 8 to 15.

Figure 8:
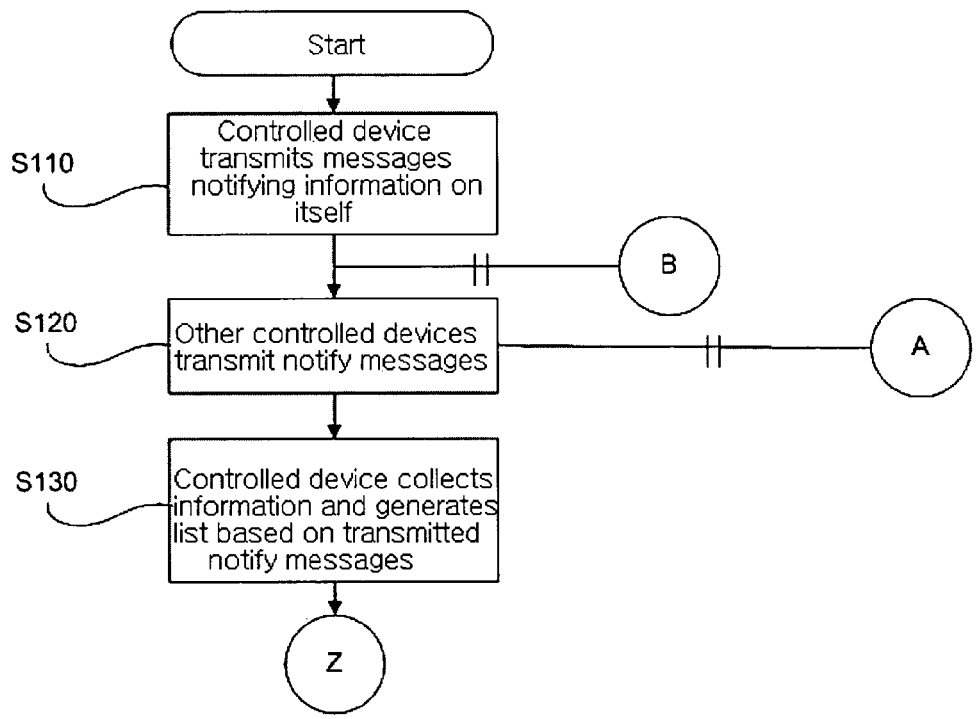
FIG. 8 is a view illustrating an initialization process in the method of providing a list of controlled devices according to the present invention.

FIG. 8 is a view illustrating an initialization process in the method of providing the list of controlled devices according to the present invention. First, if the controlled device 1000 (FIG. 6) is connected to the network, the controlled device 1000 multicasts a message notifying that the controlled device 1000 is connected to the network (S110). Then, other devices 1100 to 1500 that have been connected to the network transmit Notify Alive messages sending information about themselves in response to the message transmitted from the controlled device 1000 (S120).

Thereafter, the controlled device 1000 generates a list of controlled devices by collecting information on the other controlled devices 1100 to 1500 connected in the network through the transmitted Notify Alive messages (S130).

Here, process "A" in which Notify Alive messages from the controlled devices 1000 to 1500 are received, and process "B" in which a search message is received from the control point 2000 may be performed in parallel with the initialization process.

Figure 9:
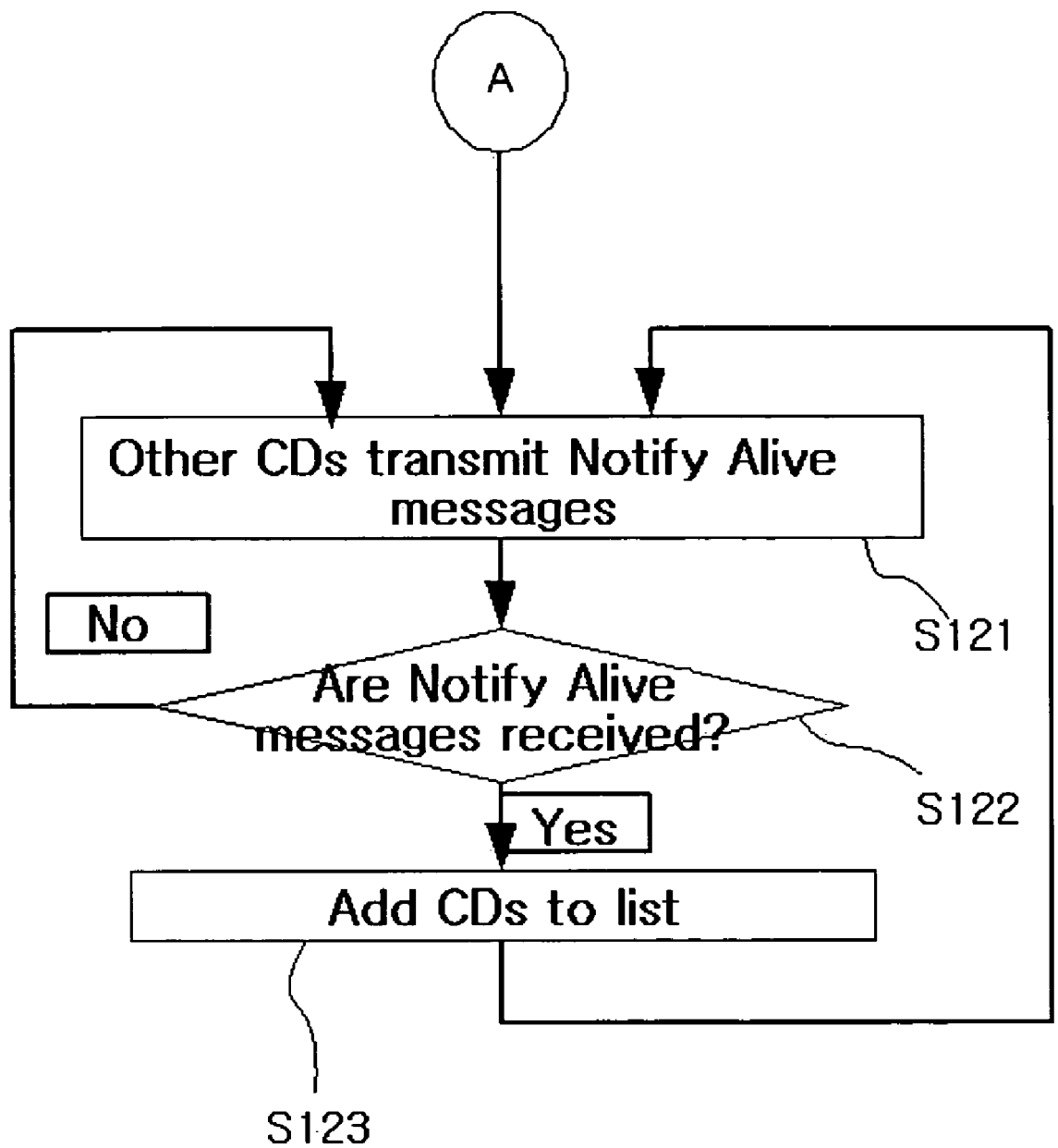
FIG. 9 is a view illustrating the process of receiving, by a controlled device, Notify Alive messages transmitted from other controlled devices in the method of providing the list of controlled devices according to the present invention.

FIG. 9 is a view illustrating the process of receiving, by a controlled device, Notify Alive messages transmitted from other controlled devices in the method of providing the list of controlled devices according to the present invention, which corresponds to step S120 or process "A" of FIG. 8.

Here, other controlled devices 1100 to 1500 transmit Notify Alive messages to the controlled device 1000 (S121), and the controlled device 1000 checks whether the Notify Alive messages are received from other controlled devices 1100 to 1500 (S122). If the Notify Alive messages are received from other controlled devices 1100 to 1500, the controlled device 1000 adds other controlled devices that have transmitted the Notify Alive messages, to the device list management module 1021 of the controlled device 1000 (S123).

Figure 10:
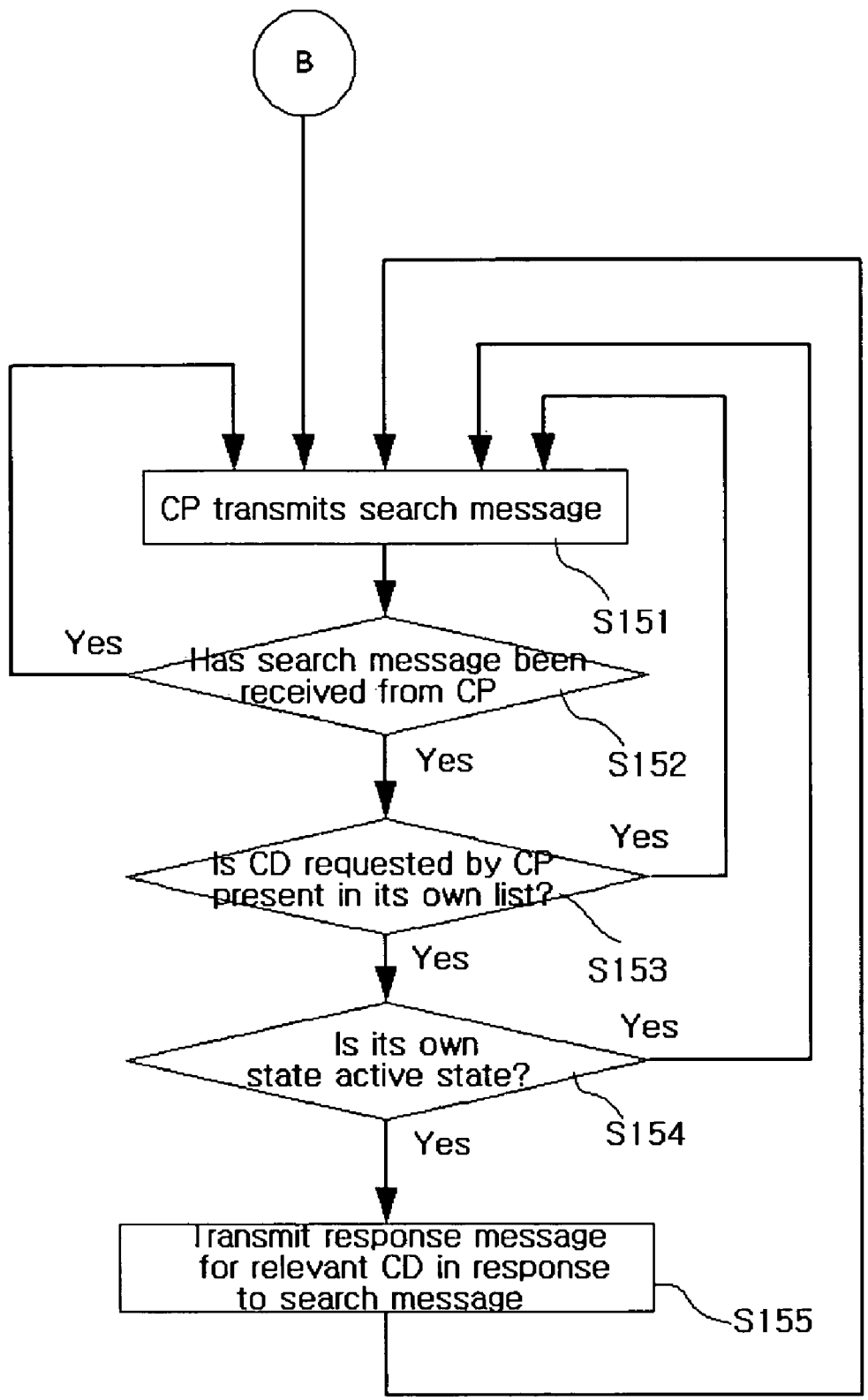
FIG. 10 is a view illustrating the process of receiving, by a controlled device, a search message transmitted from a control point in the method of providing the list of controlled devices according to the present invention.

FIG. 10 is a view illustrating the process of receiving, by a controlled device, a search message transmitted from a control point in the method of providing the list of controlled devices according to the present invention, which corresponds to process "B" of FIG. 8.

First, if the control point 2000 multicasts the search message to the controlled device 1000 (S151), the controlled device 1000 checks whether the search message is received from the control point 2000 (S152). If the search message is received from the control point 2000, the controlled device 1000 performs a search to determine whether a type of the controlled device requested by the received search message is present in its device list management module 1021 (S153).

Thereafter, the controlled device 1000 determines whether its own state is the active state (S154). Here, the active state means a state where the controlled device 1000 holds a token.

If the controlled device 1000 is in the active state, the controlled device 1000 transmits an information message for a relevant controlled device to the control point 2000 (S155).

In the meantime, if a controlled device requested by the control point 2000 is not present in the device list management module 1021 of the controlled device 1000 or the controlled device 1000 is not in the active state, the controlled device 1000 cannot transmit a response message to the control point 2000.

Figure 11:
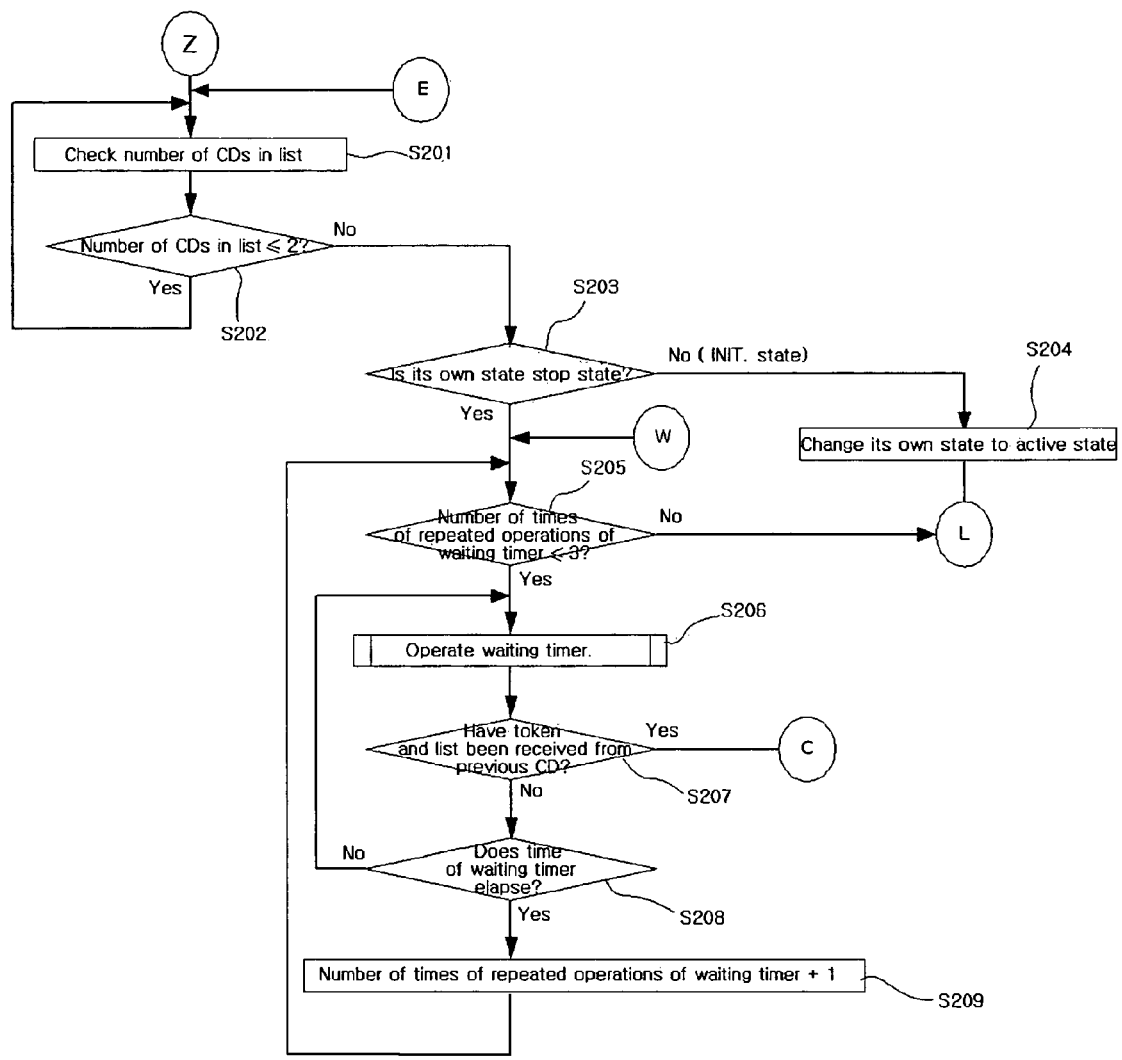
FIG. 11 is a view illustrating the process of determining whether a token is generated in the method of providing the list of controlled devices according to the present invention.

FIG. 11 is a view illustrating the process of determining whether a token is generated in the method of providing the list of controlled devices according to the present invention. The number of controlled devices included in the list of controlled devices prepared through the initialization process is checked (S201). If the number of controlled devices included in the list of controlled devices is more than 2, the controlled device 1000 checks its own state information (S202, S203). Here, the state information can be considered as the initial state, the active state or the stop state.

If the number of controlled devices included in the list is less than 2, steps S201 and S202 are repeatedly performed until the number of controlled devices becomes more than 2.

Thereafter, if the controlled device 1000 is in the initial state as a result of the check of the state information, the controlled device 1000 changes its own state to the active state and performs the processes of generating and transferring a token (i.e., process "L") (S204).

If the controlled device 1000 is in the stop state as a result of the check of the state information, the controlled device 1000 operates the waiting timer and determines whether the operation of the waiting timer will be retried (for example, three times) (S205). That is, the waiting timer of the controlled device 1000 is operated (S206), and it is determined whether a token and a list of controlled devices are received from a previous controlled device (S207). Here, if the token and the list of controlled devices have been received from the previous controlled device, it proceeds to a token transferring process (i.e., process "C").

Meanwhile, if the token and the list of controlled devices have not yet been received from the previous controlled device, it is determined whether the set time of the waiting timer of the controlled device 1000 elapses (S208). Here, if the set time of the waiting timer does not elapse, the waiting timer continues to operate. If the set time of the waiting timer elapses, the number of times of operations of the waiting timer is checked and the waiting timer is then operated again (S209). Here, the waiting timer is operated many times (for example, three times). If the waiting timer has repeated its operation as may as the set number of times, the controlled device 1000 automatically generates a token (i.e., process "L").

Figure 12:
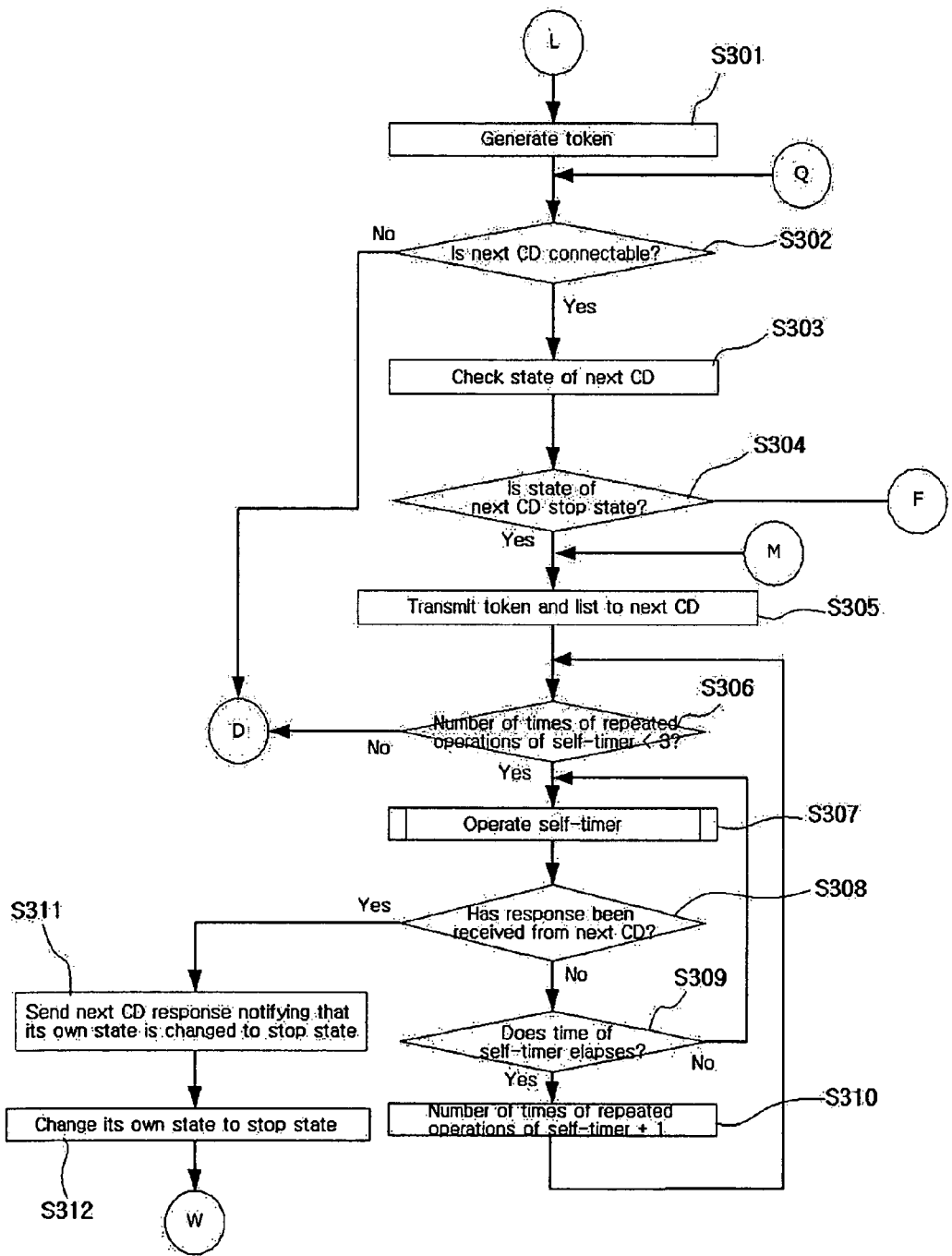
FIG. 12 is a view illustrating the process of generating and transferring the token in the method of providing the list of controlled devices according to the present invention.

FIG. 12 is a view illustrating the process of generating and transferring the token in the method of providing the list of controlled devices according to the present invention. The controlled device 1000 first generates the token (S301), determines whether the next controlled device can be connected thereto, and checks the state of the next controlled device (S302, S303). Here, if the next controlled device cannot be connected thereto, the controlled device 1000 performs a Notify Byebye message transmitting process (i.e., process "D"). The Notify Byebye message transmitting process will be described in detail with reference to FIG. 15.

Thereafter, if it is determined that the next controlled device is not in the stop state, a negotiation process (i.e., process "F") is performed. The negotiation process will be described in detail with reference to in FIG. 14.

In the meantime, if it is checked that the next controlled device is in the stop state (S304), the controlled device 1000 transfers the token and the list of controlled devices to the next controlled device (S305). Here, the controlled device 1000 that has transferred the list is modified to be the last in the list of controlled devices, and a controlled device recorded as the first in the modified list is determined as the next controlled device to which the list will be transferred.

Thereafter, the controlled device 1000 that has transmitted the token and the list of controlled devices operates the self-timer and determines whether a response (ACK) message is received from the next controlled device (S307, S308).

If the response message is received from the next controlled device, the controlled device 1000 sends the next controlled device a response message notifying that its own state has been changed to the stop state, and then changes its own state to the stop state (S311, S312) (i.e., state "W").

In the meantime, if a response message is not received from the next controlled device, the controlled device 1000 determines whether the set time of the self-timer elapses (S309). Here, if the set time of the self-timer does not elapse, the self-timer continues to operate. If the set time of the self-timer elapses, the controlled device 1000 checks the number of times of repeated operations of the self-timer and operates the self-timer again (S310). Here, the number of times of repeated operations of the self-timer is set to three times, and the set number of times of repeated operations may be arbitrarily changed by a user.

Further, if it is determined that the number of times of repeated operations of the self-timer is more than 3 (S306), the controlled device 1000 performs a Notify Byebye message transmitting process (i.e., process "D") for the next controlled device. The Notify Byebye message transmitting process will be descried in detail with reference to FIG. 15.

Figure 13:
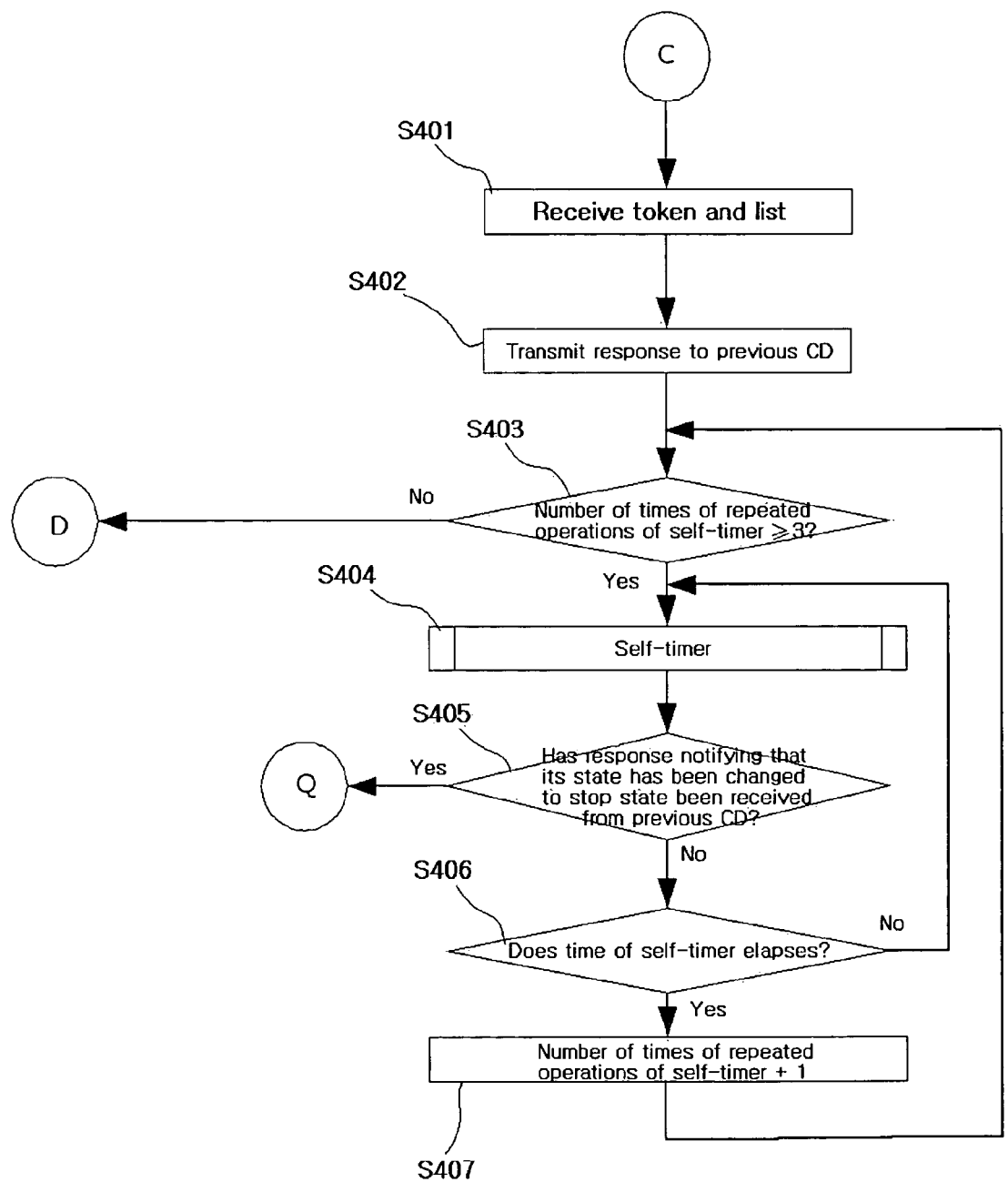
FIG. 13 is a view illustrating the process of transferring, by a previous controlled device, the token to a controlled device in the method of providing the list of controlled devices according to the present invention.

FIG. 13 is a view illustrating the process of transferring, by a previous controlled device, the token to a controlled device in the method of providing the list of controlled devices according to the present invention. The controlled device 1000 first receives the token and the list transmitted from the previous controlled device (S401).

Thereafter, the controlled device 1000 transmits a response message to the previous controlled device and operates the self-timer (S402, S404).

Then, the controlled device 1000 checks whether a response message notifying that the state of the previous controlled device has been changed to the stop state has been received from the previous controlled device (S405).

If it is checked that the response message has been received from the previous controlled device, the controlled device 1000 prepares to transmit the token and the list to the next controlled device (i.e., process "Q"). If it is determined that the response message has not yet been received from the previous controlled device, the controlled device 1000 determines whether the set time of the self-timer elapses (S406). Here, if the set time of the self-timer does not elapse, the controlled device 1000 continues to operate the self-timer. If the set time of the self-timer elapses, the controlled device 1000 checks the number of times of repeated operations of the self-timer and operates the self-timer again (S407). Here, the number of times of repeated operations of the self-timer is set to three times, and the set number of times of repeated operations may be arbitrarily changed by a user.

Thereafter, if the number of times of repeated operations of the self-timer is more than 3 as a result of the check (S403), the controlled device 1000 performs the Notify Byebye message transmitting process (i.e., process "D"). The Notify Byebye message transmitting process will be descried in detail with reference to FIG. 15.

Figure 14:
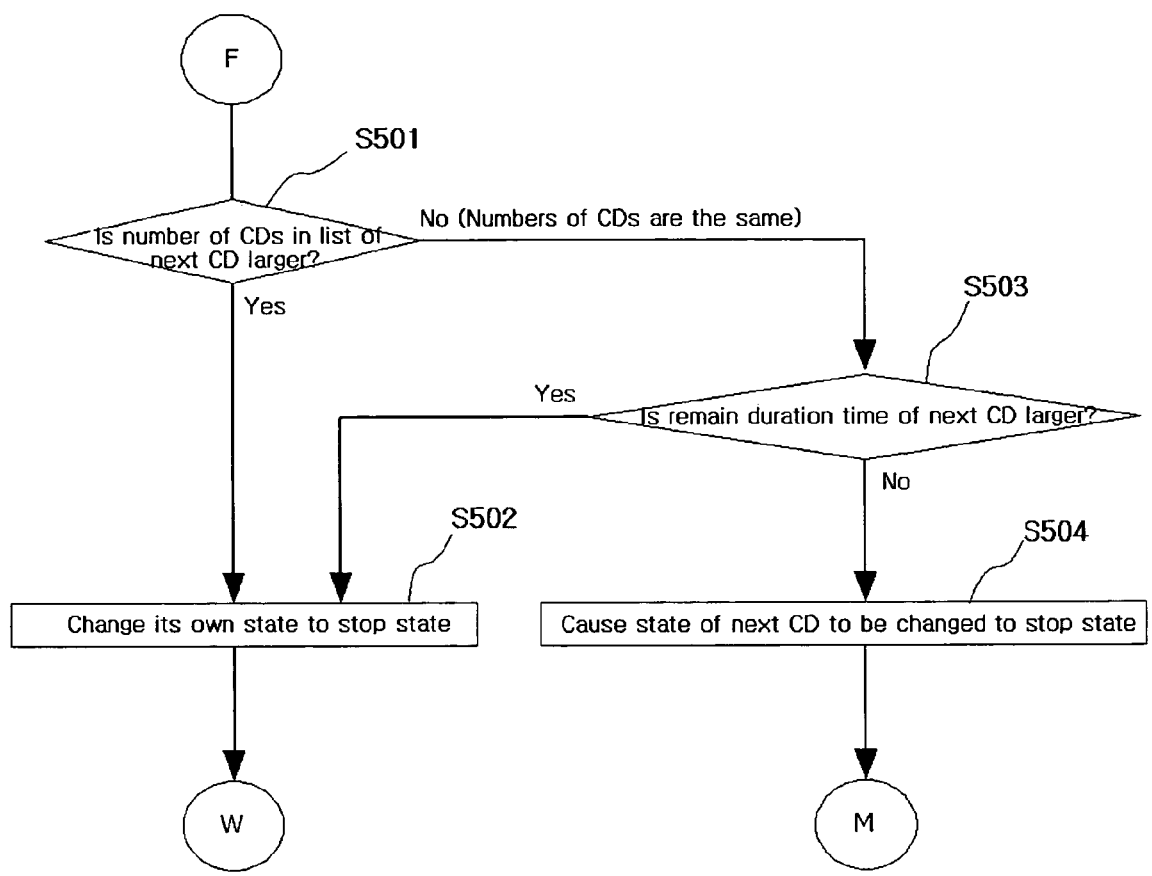
FIG. 14 is a view illustrating a negotiation process in the method of providing the list of controlled devices according to the present invention.

FIG. 14 is a view illustrating the negotiation process in the method of providing the list of controlled devices according to the present invention, which will be described together with step S304 of FIG. 12 mentioned above.

The controlled device 1000 checks the next controlled device in order to transmit the token and the list of controlled devices to the next controlled device. At this time, if the next controlled device is not in the stop state, i.e. the next controlled device has a token, the controlled device 1000 performs the negotiation process.

First, the controlled device 1000 compares the numbers of controlled devices included in the lists of controlled devices stored in the device list management modules 1021 of the controlled device 1000 and the next controlled device with each other. If the number of controlled devices included in the list held by the next controlled device is larger than that in the list held by the controlled device 1000, the controlled device 1000 changes its own state to the stop state (S501, S502).

In the meantime, if the next controlled device has the same number of controlled devices in the list thereof as the controlled device 1000 as a result of the comparison, the sums of the network remaining duration times of the controlled devices stored in the controlled device 1000 and the next controlled device are compared with each other (S503). Here, if the sum of the network remaining duration times of the controlled devices in the list stored in the next controlled device is larger than that in the list stored in the controlled device 1000, the controlled device 1000 changes its own state to the stop state (S502). On the contrary, if the sum of the network remaining duration times of the controlled devices in the list stored in the next controlled device is smaller than that in the list stored in the controlled device 1000, the state of the next controlled device is changed to the stop state (S504). Therefore, only one controlled device having the token exists in the network.

Figure 15:
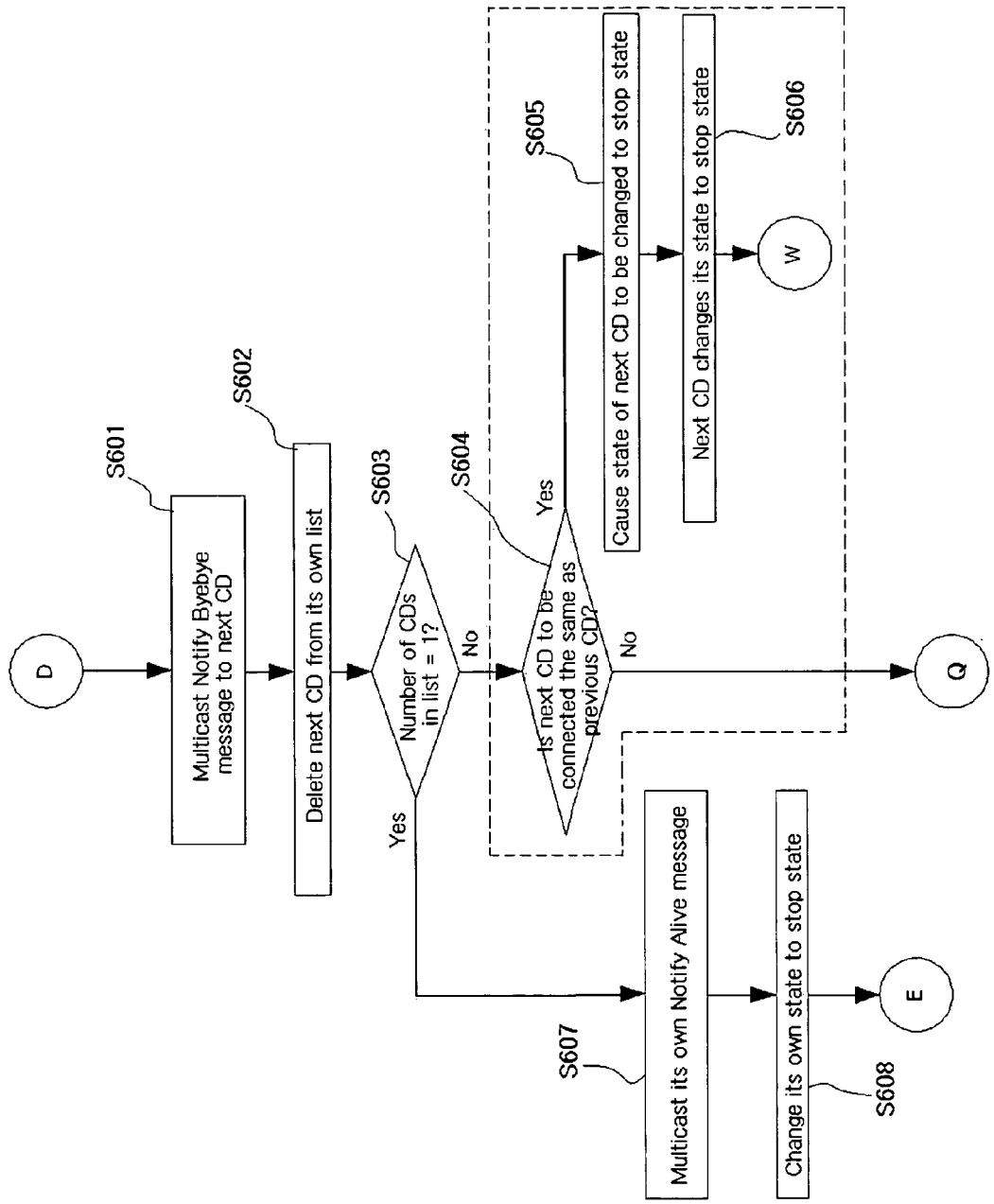
FIG. 15 is a view illustrating the process of transmitting a Notify Byebye message on behalf of other controlled devices in the method of providing the list of controlled devices according to the present invention.

FIG. 15 is a view illustrating the process of transmitting the Notify Byebye message on behalf of other controlled devices in the method of providing the list of controlled devices according to the present invention. Transmission of the Notify Byebye message by the controlled device 1000 on behalf of other controlled devices is performed in a case where the state of the next controlled device cannot be checked, i.e. the next controlled device is not connected, when checking the state of the next controlled device in order to transmit the token and the list to the next controlled device, or in a case where the controlled device has not received a response message from the next controlled device, i.e. the response message has not received from the next controlled device even after the set time of the self-timer of the controlled device 1000 elapses.

If the controlled device 1000 is not connected to the next controlled device or does not receive a response message from the next controlled device, the controlled device 1000 multicasts the Notify Byebye message on behalf of the next controlled device (S601) and deletes the next controlled device from the list stored in the device list management module 1021 (S602). Here, since the controlled device 1000 multicasts the Notify Byebye message on behalf of the next controlled device, the control point 2000 can learn information on a specific controlled device that has been abnormally terminated and thus obtain correct information on controlled devices connected in the network, thereby effectively controlling the controlled devices.

Thereafter, the controlled device 1000 checks the number of controlled devices in the list stored in the device list management module 1021, and multicasts its own Notify Alive message and changes its own state to the stop state if the number of controlled devices in the stored list is 1 (i.e., "E" state) (S603, S607, S608). If the number of controlled devices in the stored list is more than 1, the controlled device 1000 prepares to transmit the token and the list to the next controlled device (i.e., process "Q").

In the meantime, in a case where the number of controlled devices in the list stored in the device list management module 1021 of the controlled device 1000 is more than 1 and only two controlled devices exist in the network, i.e. only the controlled device 1000 and the next controlled device exist in the network, the controlled device 1000 and the next controlled device repeat the unnecessary processes of mutually transmitting the token and the same list.

Therefore, in this case, the controlled device 1000 sends the next controlled device a message causing the next controlled device to change its own state to the stop state. Accordingly, the next controlled device changes its own state to the stop state in response thereto (S604 to S606).

Then, the controlled device 1000 changes its own state to the stop state and operates a waiting timer (i.e., state "Q") (S605, 606).

Thereafter, since the number of controlled devices in the list stored in the device list management module 1021 is changed to 1, the controlled device 1000 multicasts its own Notify Alive message and changes its own state to the stop state (i.e., "E" state) (S607, S608).

Figure 16:
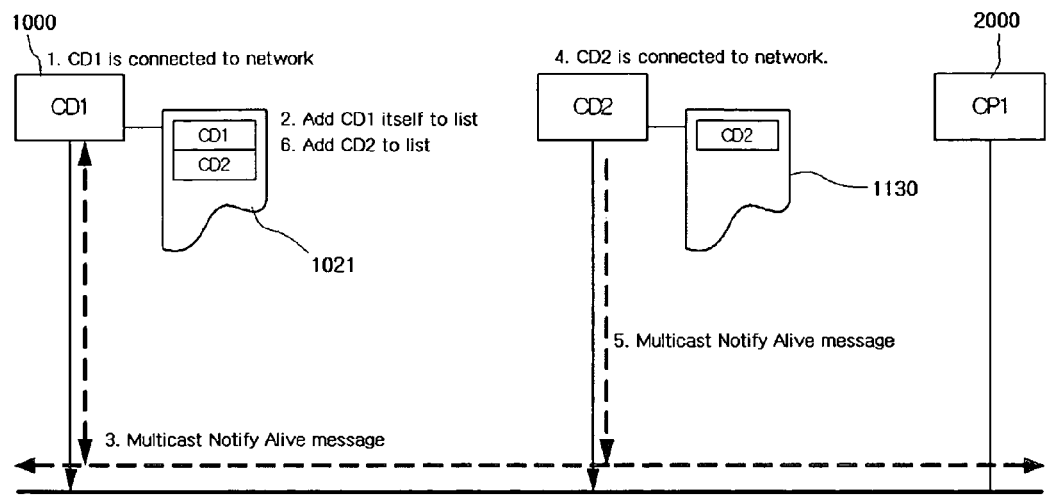
FIG. 16 is a view showing a connection operation of a controlled device and other controlled devices in operations of the network system for providing the list of controlled devices according to the present invention.

FIG. 16 is a view showing a connection operation of a controlled device and other controlled devices in operations of the network system for providing the list of controlled devices according to the present invention, which will be described in connection with the initialization process and the Notify Alive message receiving process explained with reference to FIGS. 8 and 9.

First, if a controlled device (hereinafter, referred to as "first controlled device") is connected to the network, the first controlled device transmits a message informing itself to another controlled device (hereinafter, referred to as "second controlled device").

Thereafter, the first controlled device stores information on itself in the device list management module 1021 thereof and stores information on the second controlled device, which has transmitted the Notify Alive message in response to the transmitted message, in the device list management module 1021. Thus, the first controlled device can inform the control point 2000 of information on the second controlled device existing in the network.

Figure 17:
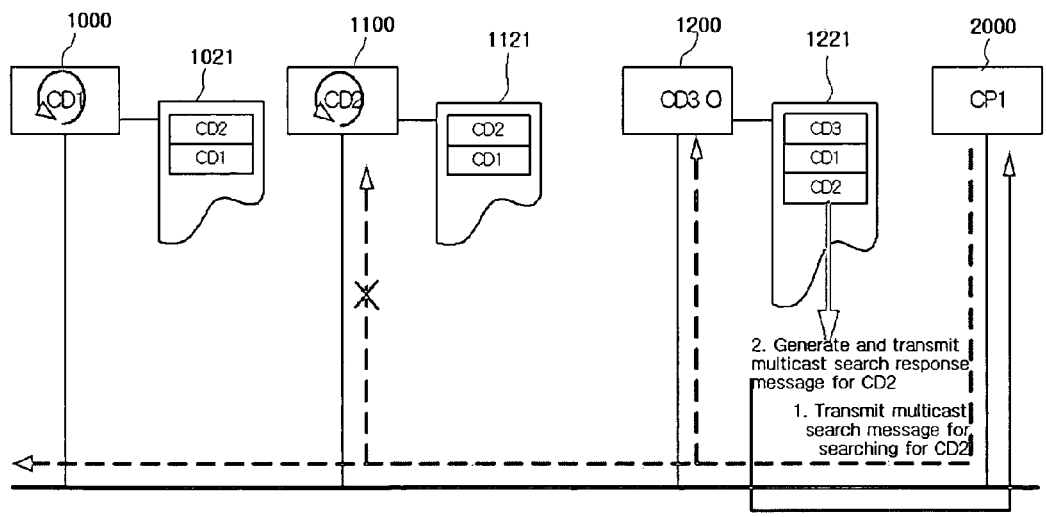
FIG. 17 is a view showing an operation for responding, by a controlled device, to a search message transmitted from a control point in the operations of the network system for providing the list of controlled devices according to the present invention.

FIG. 17 is a view showing an operation for responding, by a controlled device, to a search message transmitted from the control point in the operations of the network system for providing the list of controlled devices according to the present invention, which will be described in connection with the process of receiving, by the controlled device, the search message transmitted from the control point explained with reference to FIG. 10.

If the control point 2000 multicasts the search message for finding the second controlled device, all the controlled devices (e.g., the first, the second and the third controlled devices) existing on the network respond to the control point 2000 when they receive a multicast message of the control point 2000 and compares a search type requested by the search message and its own type and as a result of comparison it corresponds to the second controlled device.

However, if only the third controlled device 1200 receives the message multicast by the control point 2000 due to network instability, the third controlled device 1200 searches for the second controlled device 1100, which the control point 2000 intends to find, in a device list management module 1221 and makes up and transmits a response message to the control point 2000 on behalf of the second controlled device 1100.

Figure 18:
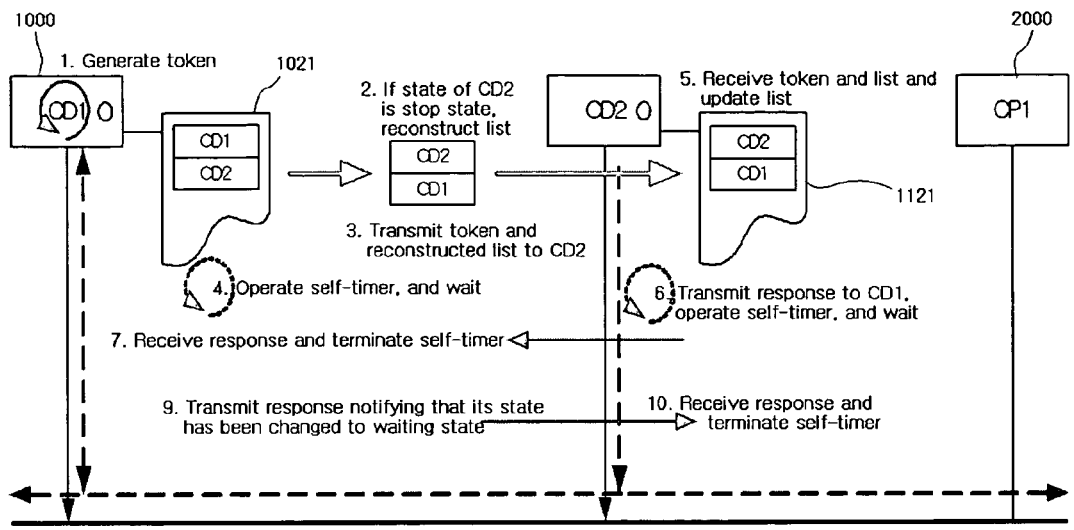
FIG. 18 is a view showing an operation for transmitting the token and the list in the operations of the network system for providing the list of controlled devices according to the present invention.

FIG. 18 is a view showing an operation for transmitting the token and the list in the operations of the network system for providing the list of controlled devices according to the present invention, which will be described in connection with the processes of generating and transferring a token with reference to FIG. 12.

The first controlled device 1000 first generates a token and then checks the state of the second controlled device. If the second controlled device is in the stop state, the first controlled device 1000 performs changes in the order of its device list management module 1021 and transmits the token and the list to the second controlled device. Thereafter, the first controlled device 1000 operates the self-timer and waits for a response from the second controlled device.

After the second controlled device updates a device list management module 1121 using the token and the list transmitted from the first controlled device 1000, the second controlled device transmits a response message to the first controlled device 1000 and operates the self-timer.

Thereafter, the first controlled device 1000 receives the response message from the second controlled device, terminates the self-timer and operates the waiting timer.

Then, if the first controlled device 1000 informs the second controlled device of the fact that the first controlled device 1000 itself has operated its waiting timer, the second controlled device accordingly receives the response message from the first controlled device 1000 and terminates its self-timer.

Figure 19:
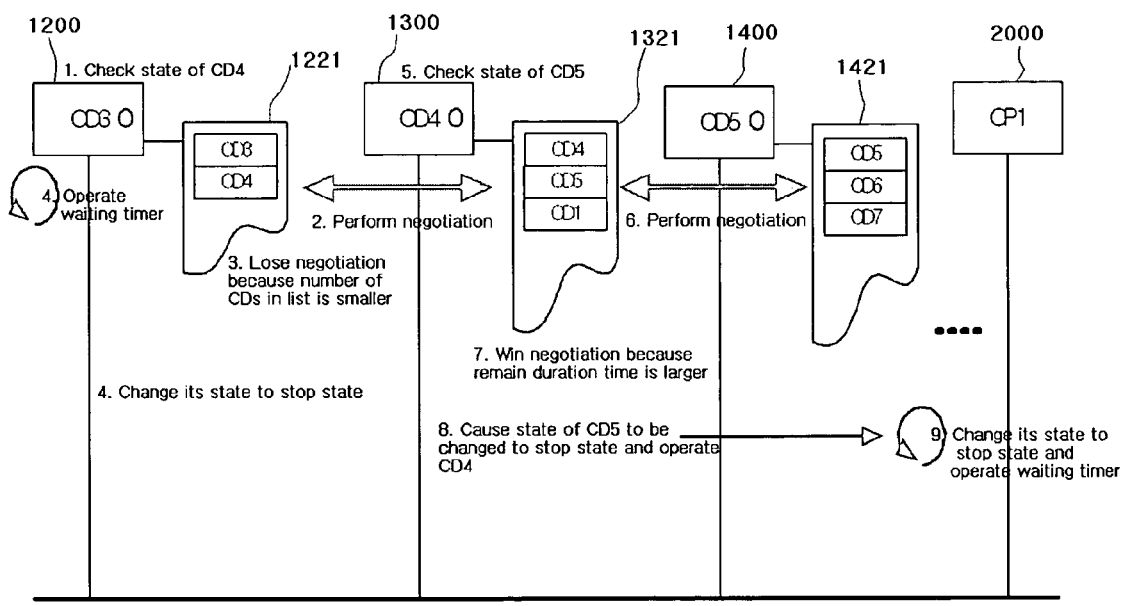
FIG. 19 is a view showing a negotiation operation between controlled devices in the operations of the network system for providing the list of controlled devices according to the present invention.

FIG. 19 is a view showing a negotiation operation between controlled devices in the operations of the network system for providing the list of controlled devices according to the present invention, which will be described in connection with the negotiation process explained with reference to FIG. 14.

As shown in FIG. 19, before the third controlled device 1200 transmits a token and a list to the fourth controlled device 1300, the third controlled device 1200 checks the state of the fourth controlled device 1300. If it is found that the fourth controlled device 1300 is in the active state, the third controlled device 1200 performs the negotiation process.

First, the third controlled device 1200 compares the number of controlled devices in the list of controlled devices stored in the device list management module 1221 of the third controlled device 1200 with that in the list stored in a device list management module 1231 of the fourth controlled device 1300. At this time, a controlled device of which the number of controlled devices in the list is large wins. That is, since the number of controlled devices in the list held by the fourth controlled device 1300 is larger than that in the list held by the third controlled device 1200, the state of the third controlled device 1200 is changed to the stop state.

If the number of controlled devices in the list held by the fourth controlled device 1300 is the same as that in the list held by the fifth controlled device 1400, the sum of network remain duration times of controlled devices stored in the fourth controlled device 1300 is compared with the sum of network remain duration times of controlled devices stored in the fifth controlled device 1400. At this time, a controlled device of which the sum of the remain duration times is large wins. That is, since the sum of the network remain duration times of the controlled devices stored in the fourth controlled device 1300 is larger than that of the fifth controlled device 1400, the state of the fifth controlled device 1400 is changed to the stop state.

Figure 20A:
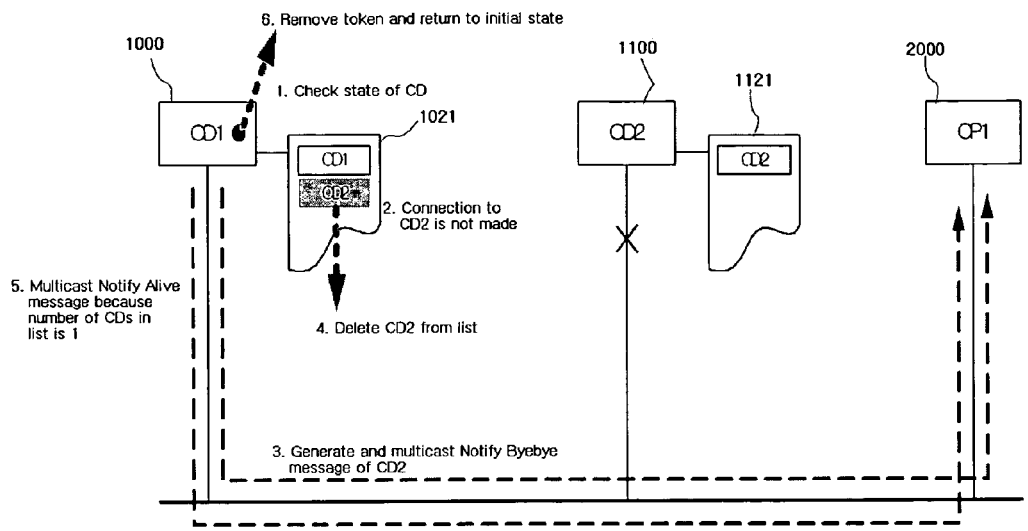
FIGS. 20A and 20B are views showing an operation for transmitting a Notify Byebye message on behalf of other controlled devices in the operations of the network system for providing the list of controlled devices according to the present invention.
Figure 20B:
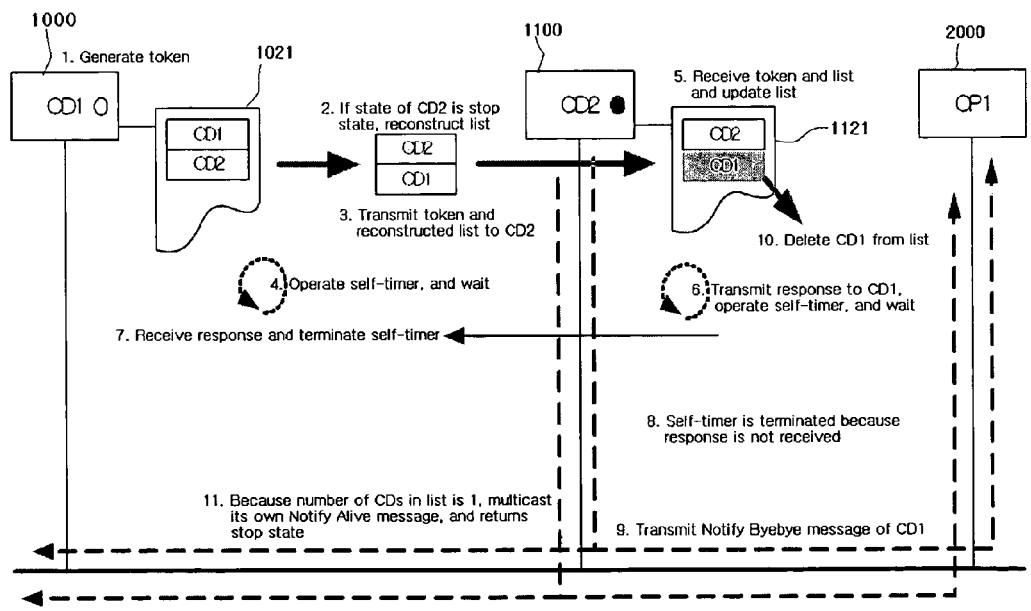

FIGS. 20A and 20B are views showing an operation for transmitting a Notify Byebye message on behalf of other controlled devices in the operations of the network system for providing the list of controlled devices according to the present invention, which will be described in connection with the process of transmitting the Notify Byebye message on behalf of other controlled devices explained with reference to FIG. 15.

FIG. 20A is a view showing an operation for multicasting, by the first controlled device, the Notify Byebye message of the second controlled device on behalf of the second controlled device in a case where the first controlled device cannot find the second controlled device.

The first controlled device 1000 first checks the state of the second controlled device 1100 in order to transmit the token and the list to the second controlled device 1100. Here, if the state of the second controlled device 1100 is not checked, i.e. if the second controlled device 1100 and the first controlled device 1000 are not connected to each other, the first controlled device 1000 deletes the second controlled device from the list stored in the device list management module 1021.

Thereafter, the first controlled device 1000 multicasts the Notify Byebye message of the second controlled device 1100.

In the meantime, if the second controlled device is deleted from the list stored in the device list management module 1021 of the first controlled device 1000, only the first controlled device itself remains in the list stored in the device list management module 1021 thereof. Thus, the first controlled device 1000 multicasts its own Notify Alive message and changes its own state to the stop state.

FIG. 20b is a view showing an operation for multicasting, by the first controlled device, the Notify Byebye message of the second controlled device on behalf of the second controlled device in a case where the first controlled device has not received a response message from the second controlled device.

The first controlled device 1000 first generates the token, transmits the token and the list to the second controlled device 1100, operates the self-timer and waits for a response from the second controlled device. Accordingly, the second controlled device 1100 transmits a response message to the first controlled device 1000 and operates the self-timer thereof.

Thereafter, the first controlled device 1000 receives the response from the second controlled device 1100 and terminates the self-timer thereof.

Then, the second controlled device 1100 operates the self-timer and waits for a response from the first controlled device 1000, which informs that the first controlled device 1000 has terminated its self-timer. If the response is not received from the first controlled device 1000 until the set time of the self-timer of the second controlled device 1100 elapses, the second controlled device 1100 multicasts the Notify Byebye message of the first controlled device 1000.

Further, the second controlled device 1100 deletes the first controlled device from the list stored in the device list management module 1121.

Therefore, since only the second controlled device 1100 remains in the list stored in the device list management module 1121 of the second controlled device 1100, the second controlled device 1100 multicasts its own Notify Alive message and changes its own state to the stop state.

According to the present invention, since a controlled device has a list of other controlled devices connected thereto in a network, when a message searching for a specific controlled device has been received from a control point, another controlled device can transmit a response message to the control point on behalf of the specific controlled device even though the specific controlled device cannot receive the message from the control point. Thus, there is an advantage in that the control point can efficiently control controlled devices even though the network is unstable.

Further, if controlled devices find the fact that a specific controlled device does not exist in the network while updating their lists of controlled devices, they inform the control point of the fact. Thus, the control point can correctly recognize information on a controlled device that does not exist in the network, thereby effectively controlling the controlled devices.

Although the present invention has been described in connection with the preferred embodiments thereof, it will be apparent to those skilled in the art that various changes and modifications can be made thereto without departing from the scope and spirit of the present invention defined by the appended claims. Therefore, simple changes of the embodiments of the present invention will fall within the scope of the invention.

What is claimed is:

1. A network system, comprising:
   a control point which transmits discovery packets to search for devices existing in a network, receive response messages thereto and control the devices existing in the network; and
   controlled devices, each of which receives notify messages transmitted from other controlled devices connected in the network, wherein each of the notify messages includes an operational state of the transmitting controlled device, generates, stores and manages a list of service information on the operational state of all controlled devices connected in the network, through the received notify messages, and searches and transmits service information on a controlled device requested by the control point to the control point,
   wherein the control point comprises a cache which stores information regarding devices on the network,
   wherein each controlled device generates a token, transfers the generated token to another controlled device, and manages the token, the token transferring comprising:
      checking, by the controlled device, the number of controlled devices in the list of controlled devices stored in the controlled device;
      if it is determined that the number of controlled devices in the list is more than two, transferring the token and the stored list of controlled devices to another controlled device;

checking whether a response message is received from the other controlled device and operating a self-timer of the controlled device; and if the response message is received from the other controlled device, stopping the self-timer and operating a waiting timer of the controlled device; and if the response message is not received from the other controlled device;

the controlled device deletes the other controlled device, which has not transmitted the response message, from the list of controlled devices; and the controlled device notifies a control point that the controlled device, which had not transmitted the response message, does not exist in the network.

2. The system as claimed in claim 1, wherein each controlled device comprises:

a message receiving module which receives notify messages transmitted from the controlled devices connected in the network;

a device list management module which collects the service information regarding the controlled devices connected in the network and which creates and manages a list of service information of all the controlled devices connected in the network, wherein the service information includes the operational state of each of the controlled devices; and a control module which searches for service information of a specific controlled device, which has been requested by the control point, in the device list management module and which transmits the searched information to the control point.

3. The system as claimed in claim 2, wherein the message receiving module receives a search message transmitted from the control point.

4. The system as claimed in claim 1, wherein each controlled device further comprises a token management module which generates the token, transfers the generated token to another controlled device and manages the token.

5. The system as claimed in claim 4, wherein the control module responds to an information request message from the control point by checking whether the token is present in the controlled devices.

6. The system as claimed in claim 5, wherein the checking of the presence of the token comprises using state information on the controlled devices.

7. The system as claimed in claim 6, wherein the state information is any one of an initial state, an active state and a stop state.

8. The system as claimed in claim 4, further comprising a timer management module operable to create the self-timer, wherein when a token managed by a token management module is transferred to another controlled device, the self-timer checks a response time of the other controlled device to which the token is transferred.

9. The system as claimed in claim 8, wherein the timer management module creates the waiting timer, and the waiting timer determines the total circulation time of the token for controlled devices existing in the network.

10. The system as claimed in claim 4, wherein each controlled device further comprises a negotiation module which controls the validity of each token when a plurality of tokens are present in the controlled devices existing in the network.

11. The system as claimed in claim 10, wherein the negotiation module determines whether the plurality of tokens are present by using state information of each controlled device.

12. The system as claimed in claim 10, wherein the negotiation module controls the validity of each token by comparing the numbers of controlled devices in lists of controlled devices stored in respective controlled devices having the tokens.

13. The system as claimed in claim 12, wherein if the numbers of controlled devices in the lists held by the controlled devices are the same, the negotiation module controls the validity of each token by comparing the sums of network remaining duration times of the respective controlled devices registered in the lists.

14. A method of providing a list of controlled devices comprising:

receiving notify messages from controlled devices connected in a network, wherein each of the notify messages includes an operational state of the transmitting controlled device;

collecting service information regarding the controlled devices connected in the network through the received notify messages and generating a list of controlled devices, wherein the list of controlled devices includes the operational state of each of the controlled devices;

receiving an information request message for a specific controlled device;

searching for information regarding the specific controlled device for which the information request message is received, in the generated list;

transmitting the information regarding the searched specific controlled device generating a token by each controlled device;

transferring the token to another controlled device, wherein the token transferring comprises:

checking, by the controlled device, the number if controlled devices in the list of controlled devices stored in a device list management module of the controlled device;

if it is determined that the number of controlled devices in the list is more than two, transferring the token and the stored list of controlled devices to another controlled device;

checking whether a response message is received from the other controlled device and operating a self-timer of the controlled device; and if the response message is received from the other controlled device, stopping the self-timer and operating a waiting timer of the controlled device; and if the response message is not received from the other controlled device;

deleting, by the controlled device, the other controlled device, which has not transmitted the response message, from the list of controlled devices stored in the device list management module; and notifying, by the controlled device, a control point that the controlled device, which has not transmitted the response message, does not exist in the network.

15. The method as claimed in claim 14, wherein the searching is performed when the token is present in the controlled device as a result of checking whether the token is present in the controlled device.

16. The method as claimed in claim 14, wherein the list transferring comprises modifying the list of controlled devices so the controlled device which has transferred the list becomes the last in the list, and identifying a controlled device, which has recorded as the first in the modified list, as a controlled device to which the list will be transferred.

17. The method as claimed in claim 14, wherein the self-timer determines a response time of the other controlled device to which the token is transferred.

18. The method as claimed in claim 14, wherein the waiting timer determines the total circulation time of the token for controlled devices existing in the network.

19. The method as claimed in claim 14, further comprising:
if a token is not received from other controlled devices even after the operation of the waiting timer is completed, automatically generating a token.

20. The method as claimed in claim 14, further comprising:
if the response message is not received from the other controlled device, transferring the token and the stored list of controlled devices to a further controlled device by the controlled device.

21. The method as claimed in claim 14, further comprising:
if a plurality of tokens are present in controlled devices existing in the network, performing negotiation for controlling the validity of each token.

22. The method as claimed in claim 21, wherein the negotiation comprises:
controlling the validity of each token by comparing the numbers of controlled devices in lists of controlled devices held by the respective controlled devices having the tokens.

23. The method as claimed in claim 22, wherein the negotiation further comprises:
if the numbers of controlled devices in the lists of controlled devices are the same as a result of the comparison, controlling the validity of each token by comparing the sums of network remaining duration times of the respective controlled devices registered in the lists.

24. A method of providing a list of controlled devices comprising:
receiving, in a controlled device, notify messages from other controlled devices connected in a network, wherein each of the notify messages includes an operational state of the transmitting controlled device
collecting service information on the controlled devices connected in the network through the received notify messages and generating a list of controlled devices, wherein the list of controlled devices includes the operational state of each of the controlled devices;
requesting, by a control point, information on a specific controlled device;
searching for, by the controlled device, the information regarding the specific controlled device requested by the control point, in the generated list;
transmitting the information on the searched specific controlled device
generating a token by each controlled device;
transferring the token to another controlled device, wherein the token transferring comprises:
checking, by the controlled device, the number of controlled devices in the list of controlled devices stored in a device list management module of the controlled device;
if it is determined that the number if controlled devices in the list is more than two, transferring the token and the stored list of controlled devices to another controlled device,
checking whether a response message is received from the other controlled devices and operating a self-timer of the controlled device; and
if the response message is received from the other controlled device, stopping the self-timer and operating a waiting timer of the controlled device; and if the response message is not received from the other controlled device;
deleting, by the controlled device, the other controlled device, which has not transmitted the response message, from the list of controlled devices stored in the device list management module; and
notifying, by the controlled device, the control point that the controlled device, which has not transmitted the response message, does not exist in the network.

25. The method as claimed in claim 24, wherein the searching is performed when the token is present in the controlled device as a result of checking whether the token is present in the controlled device.

26. The method as claimed in claim 24, wherein the list transferring comprises modifying the list of controlled devices so that the controlled device which has transferred the list becomes the last in the list, and identifying a controlled device, which has been recorded as the first in the modified list, as a controlled device to which the list will be transferred.

27. The method as claimed in claim 24, wherein the self-timer checks a response time of the other controlled devices to which the token is transferred.

28. The method as claimed in claim 24, wherein the waiting timer checks the total circulation time of the token for controlled devices existing in the network.

29. The method as claimed in claim 24, further comprising:
if a token is not received from other controlled devices even after the operation of the waiting timer is completed, automatically generating a token.

30. The method as claimed in claim 24, further comprising:
if the response message is not received from the other controlled device, transferring the token and the stored list of controlled devices to a further controlled device by the controlled device.

31. The method as claimed in claim 27, further comprising:
if a plurality of tokens are present in controlled devices existing in the network, performing negotiation for controlling the validity of each token.

32. The method as claimed in claim 31, wherein the negotiation comprises:
controlling the validity of each token by comparing the numbers of controlled devices in lists of controlled devices held by the respective controlled devices having the tokens.

33. The method as claimed in claim 32, wherein the negotiation further comprises:
if the numbers of controlled devices in the lists of controlled devices are the same as a result of the comparison, controlling the validity of each token by comparing the sums of network remaining duration times of the respective controlled devices registered in the lists.

* * * * *